United States Patent
Do et al.

(10) Patent No.: US 9,578,459 B2
(45) Date of Patent: Feb. 21, 2017

(54) HYBRID POSITIONING TECHNIQUES BASED ON RTT AND TOA/TDOA

(71) Applicant: QUALCOMM Incorporated, San Diego, CA (US)

(72) Inventors: Ju-Yong Do, Palo Alto, CA (US); Benjamin Werner, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/732,403

(22) Filed: Jun. 5, 2015

(65) Prior Publication Data

US 2016/0360362 A1    Dec. 8, 2016

(51) Int. Cl.
H04W 4/02 (2009.01)
H04W 56/00 (2009.01)

(52) U.S. Cl.
CPC ....... H04W 4/023 (2013.01); H04W 56/0045 (2013.01); H04W 56/0065 (2013.01)

(58) Field of Classification Search
CPC ....... H04W 4/023; H04W 64/00; H04W 4/02; H04W 4/008; H04W 64/003; H04W 4/04; H04W 56/0065; H04W 56/0045; H04W 56/00; H04W 56/0005; H04W 56/001; H04W 56/002; H04W 56/0025; H04W 56/005; H04W 56/0075
See application file for complete search history.

(56) References Cited

U.S. PATENT DOCUMENTS

| | | | |
|---|---|---|---|
| 9,185,676 B2* | 11/2015 | Kangas | G01S 5/0226 |
| 2003/0004640 A1* | 1/2003 | Vayanos | G01S 5/14 701/469 |
| 2004/0002344 A1 | 1/2004 | Moeglein et al. | |
| 2008/0274750 A1 | 11/2008 | Carlson et al. | |
| 2009/0303120 A1 | 12/2009 | Alizadeh-Shabdiz | |
| 2012/0293372 A1 | 11/2012 | Amendolare et al. | |
| 2013/0211780 A1* | 8/2013 | Meador | G01S 13/878 702/158 |
| 2013/0250931 A1* | 9/2013 | Abraham | H04W 8/005 370/338 |
| 2013/0316727 A1* | 11/2013 | Edge | H04W 4/02 455/456.1 |
| 2014/0016621 A1* | 1/2014 | Zhang | H04W 56/0055 370/336 |
| 2014/0286324 A1 | 9/2014 | Aldana et al. | |
| 2014/0295881 A1* | 10/2014 | Werner | H04W 4/023 455/456.1 |
| 2015/0011238 A1* | 1/2015 | Tujkovic | H04W 4/02 455/456.1 |

* cited by examiner

*Primary Examiner* — Magdi Elhag
(74) *Attorney, Agent, or Firm* — Berkeley Law & Technology Group, LLP

(57) ABSTRACT

Example methods, apparatuses, or articles of manufacture are disclosed herein that may be utilized, in whole or in part, to facilitate or support one or more operations or techniques for hybrid RTT and TOA positioning, such as for use in or with a mobile communication device, for example.

40 Claims, 5 Drawing Sheets

HYBRID POSITIONING TECHNIQUES BASED ON RTT AND TOA/TDOA

BACKGROUND

1. Field

The present disclosure relates generally to position or location estimations of mobile communication devices and, more particularly, to hybrid round trip time (RTT) and time of arrival (TOA)/time difference of arrival (TDOA) positioning techniques for use in or with mobile communication devices.

2. Information

Mobile communication devices, such as, for example, cellular telephones, portable navigation units, laptop computers, personal digital assistants, or the like are becoming more common every day. Certain mobile communication devices, such as, for example, location-aware cellular telephones, smart telephones, or the like may assist users in estimating their geographic locations by providing positioning assistance parameters obtained or gathered from various systems. For example, in an outdoor environment, certain mobile communication devices may obtain an estimate of their geographic location or so-called "position fix" by acquiring wireless signals from a satellite positioning system (SPS), such as the global positioning system (GPS) or other like Global Navigation Satellite Systems (GNSS), cellular base station, etc. via a cellular telephone or other wireless or electronic communications network. Acquired wireless signals may, for example, be processed by or at a mobile communication device, and its location may be estimated using known techniques, such as Advanced Forward Link Trilateration (AFLT), base station identification, cell tower triangulation, or the like.

In an indoor environment, mobile communication devices may be unable to reliably receive or acquire satellite or like wireless signals to facilitate or support one or more position estimation techniques. For example, signals from an SPS or other wireless transmitters may be attenuated or otherwise affected in some manner (e.g., insufficient, weak, fragmentary, etc.), which may at least partially preclude their use for position estimations. At times, a mobile communication device may obtain a position fix by measuring ranges to three or more terrestrial wireless access points positioned at known locations. Ranges may be measured, for example, by obtaining a Media Access Control identifier (MAC ID) address from wireless signals received from suitable access points and measuring one or more characteristics of received signals, such as signal strength, round trip delay, or the like. In some instances, however, such as if time of flight-related measurements are utilized, for example, for more accurate positioning, time synchronization between access points and/or mobile communication devices may be needed or otherwise useful. Thus, at times, clock drifts of participating devices may limit or affect positioning accuracy of a mobile communication device and/or may make location estimates prone to degradation (e.g., the deviation in the position fix may grow with time).

BRIEF DESCRIPTION OF THE DRAWINGS

Non-limiting and non-exhaustive aspects are described with reference to the following figures, wherein like reference numerals refer to like parts throughout the various figures unless otherwise specified.

SUMMARY

Figure 1:
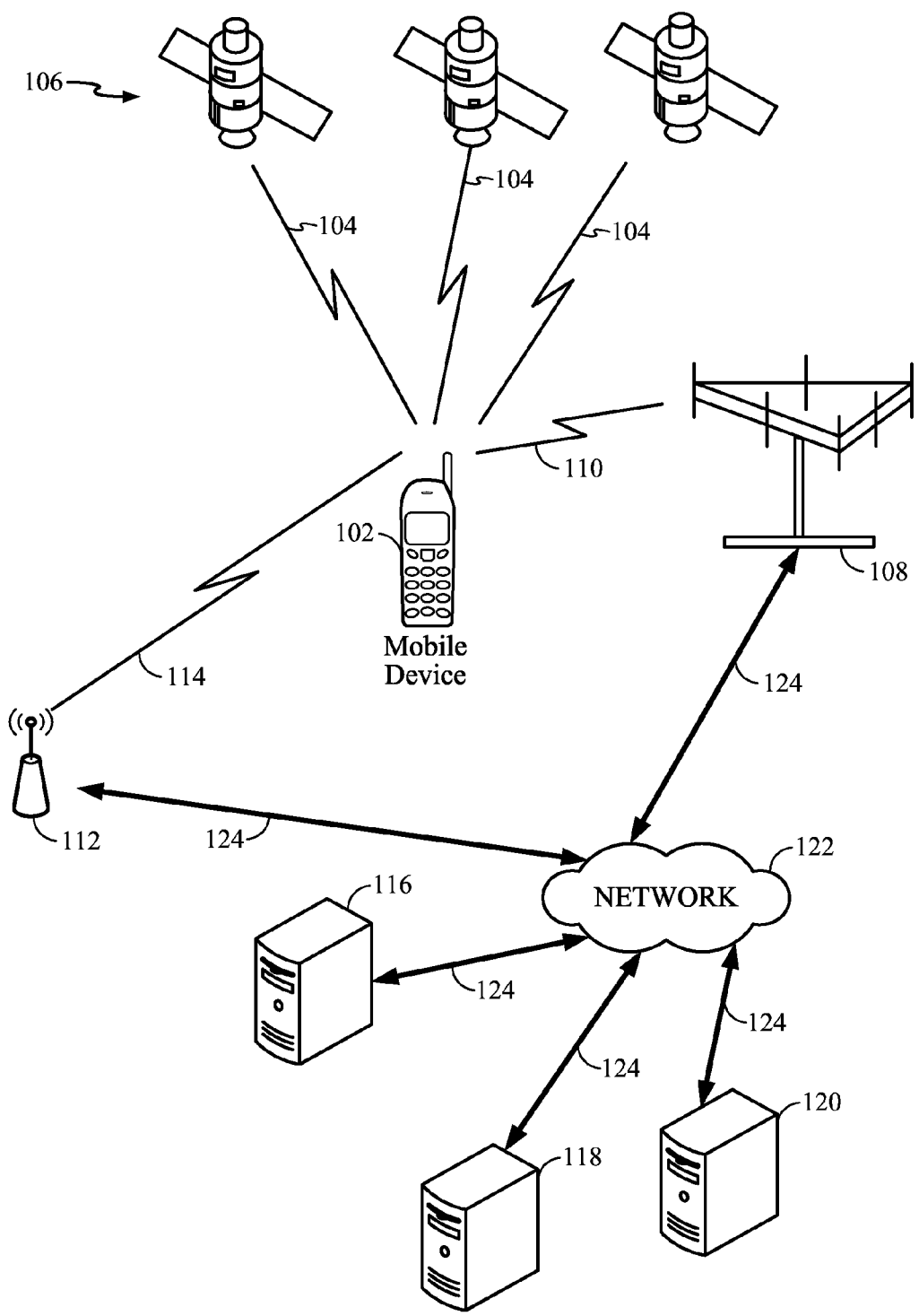
FIG. 1 is a schematic diagram illustrating features associated with an implementation of an example operating environment.

Example implementations relate to techniques for hybrid RTT and TOA/TDOA positioning for location determination. In one implementation, a method may comprise determining, at a mobile device, a location of the mobile device based, at least in part, on a measurement of a round-trip time (RTT) of a message exchange with one or more stationary transponder devices; estimating a bias between a first clock maintained at the mobile device and a second clock maintained at the one or more stationary transponder devices based, at least in part, on a difference between the determined location and locations of the one or more stationary transponder devices, and a timing reference detected in one or more first signals acquired from the one or more stationary transponder devices; and computing a range to the one or more stationary transponder devices based, at least in part, on a time of flight-related measurement acquired from the one or more first signals and on the estimated bias.

In another implementation, an apparatus may comprise means for determining a location of a mobile device based, at least in part, on a measurement of a round-trip time (RTT) of a message exchange with one or more stationary transponder devices; means for estimating a bias between a first clock maintained at the mobile device and a second clock maintained at the one or more stationary transponder devices based, at least in part, on a difference between the determined location and locations of the one or more stationary transponder devices, and a timing reference detected in one or more first signals acquired from the one or more stationary transponder devices; and means for computing a range to the one or more stationary transponder devices based, at least in part, on a time of flight-related measurement acquired from the one or more first signals and on the estimated bias.

In yet another implementation, an apparatus may comprise a wireless transceiver to communicate with an electronic communications network; and one or more processors coupled to a memory to determine a location of a mobile device based, at least in part, on a measurement of a round-trip time (RTT) of a message exchange with one or more stationary transponder devices; estimate a bias between a first clock maintained at the mobile device and a second clock maintained at the one or more stationary transponder devices based, at least in part, on a difference between the determined location and locations of the one or more stationary transponder devices, and a timing reference detected in one or more first signals acquired from the one or more stationary transponder devices; and compute a range to the one or more stationary transponder devices based, at least in part, on a time of flight-related measurement acquired from the one or more first signals and on the estimated bias.

In yet another implementation, an article may comprise a non-transitory storage medium having instructions executable by a processor to determine a location of a mobile device based, at least in part, on a measurement of a round-trip time (RTT) of a message exchange with one or more stationary transponder devices; estimate a bias between a first clock maintained at the mobile device and a second clock maintained at the one or more stationary transponder devices based, at least in part, on a difference between the determined location and locations of the one or more stationary transponder devices, and a timing reference detected in one or more first signals acquired from the one or more stationary transponder devices; and compute a range to the one or more stationary transponder devices based, at least in part, on a time of flight-related measurement acquired from the one or more first signals and on the estimated bias. It should be understood, however, that these are merely example implementations, and that claimed subject matter is not limited to these particular implementations.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, methods, apparatuses, or systems that would be known by one of ordinary skill have not been described in detail so as not to obscure claimed subject matter.

Some example methods, apparatuses, or articles of manufacture are disclosed herein that may be implemented, in whole or in part, to facilitate or support one or more operations and/or techniques for hybrid RTT and TOA/TDOA positioning for use in or with mobile communication devices. As used herein, "mobile device," "mobile communication device," "location-aware mobile device," or like terms may be used interchangeably and may refer to any kind of special purpose computing platform or apparatus that may from time to time have a position or location that changes. In some instances, a mobile communication device may, for example, be capable of communicating with other devices, mobile or otherwise, through wireless transmission or receipt of information according to one or more communication protocols. As a way of illustration, special purpose mobile communication devices, which may herein be called simply mobile devices, may include, for example, cellular telephones, smart telephones, personal digital assistants (PDAs), laptop computers, personal entertainment systems, tablet personal computers (PC), personal audio or video devices, personal navigation devices, radio heat map generation tools, or the like. It should be appreciated, however, that these are merely examples of mobile devices that may be used, at least in part, to implement one or more operations and/or techniques for hybrid RTT and TOA/TDOA positioning, and that claimed subject matter is not limited in this regard. It should also be noted that the terms "position" and "location" may be used interchangeably herein.

As alluded to previously, in an indoor environment or like partially or substantially enclosed areas (e.g., urban canyons, etc.), certain mobile devices may be unable to reliably receive or acquire satellite or like wireless signals to facilitate or support one or more position estimation techniques. As such, different techniques may be employed to enable indoor navigation or location services. For example, an indoor position fix of a mobile device, such as a cellular telephone, may be obtained based, at least in part, on information gathered from various systems. One such system may comprise, for example, a wireless local access network (WLAN) communication system having a number of wireless transmitters, such as access points that operate in accordance with the Institute of Electrical and Electronics Engineers (IEEE) standard 802.11 (IEEE 802.11 std. Wi-Fi access points) supporting communications for a number of proximate mobile devices. Here, to obtain a position fix, a mobile device may, for example, measure ranges to three or more terrestrial Wi-Fi access points positioned at known locations, such as via one or more appropriate computations. Ranges may be measured, for example, by obtaining a Media Access Control (MAC) address from known Wi-Fi access points and measuring one or more signal characteristics indicative of received signal strength (e.g., received signal strength indicator (RSSI), etc.), round-trip delay times (e.g., RTT, etc.), or the like. Based, at least in part, on computed ranges, a mobile device may, for example, estimate its location by applying one or more suitable positioning techniques, such as trilateration, triangulation, etc., just to illustrate a few possible implementations.

Over time, recorded RSSI values within an indoor or like environment may vary, however, even if there are no or little changes to an associated propagation space. Since RSSI values may be prone to environmental interference, such as multipath fading or shadowing effects, for example, at times, path loss-related positioning may be less accurate or useful. In addition, parameters employed in these models are typically site-specific and/or nonlinear. As compared to RSSI, thus, in some instances, time of flight-related localization utilizing, for example, TOA, TDOA, or like measurements may prove beneficial since its measurement results may scale linearly with open-air propagation distances. A mobile device may, for example, compute a range to a wireless transmitter, such as a Wi-Fi access point based, at least in part, on a TOA of a beacon signal transmitted by the access point relative to some synchronized timing reference. A TOA beacon may, for example, be transmitted periodically by an access point to announce its presence in an area, relay information, such as a timestamp with a time at which the beacon was sent, service set identification (SSID) of an associated wireless network, or other network and/or access point-related information. Unfortunately, clocks of wireless transmitters and target mobile devices are typically not synchronized, meaning that a first clock state maintained at a wireless transmitter and a second clock state maintained at a mobile device may differ by an unknown bias. As such, it may be difficult or, at times, impossible for a mobile device to estimate its range to a proximate wireless transmitter with sufficient accuracy, such as to facilitate or support a requisite positioning operation, for example, based, at least in part on a TOA measurement in a transmitted beacon signal.

Thus, in some instances, a measured RTT of a request-to-send/clear-to-send (RTS/CTS) message exchange may, for example, be utilized, at least in part, to determine a range between a mobile device and a wireless transmitter, such as a Wi-Fi access point. For example, a mobile device may determine a range by measuring a signal RTT to an access point by transmitting one or more IEEE 802.11 std. probe requests (e.g., via an RTS data frame, etc.) and measuring a time until receipt of a response message (e.g., via a CTS data frame, etc.). In denser operating environments, however, such as where there are multiple mobile devices receiving service from the same access points, for example, RTS/CTS message exchanges may consume uplink and/or downlink resources that may be otherwise employed by or for other services (e.g., Internet Protocol (IP) services, etc.). In addition, to facilitate or support RTT measurements, network resources (e.g., particular access points, etc.) and time, such as to perform a requisite number of RTS/CTS message exchanges, for example, may need to be specifically allocated. This may be operationally expensive, may result in positioning latencies in denser environments, or the like. It should be noted that even though RTS/CTS message exchanges are discussed throughout the specification, such as in connection with round trip-related measurements, for example, any suitable communication protocols or standards may be used herein, at least in part, or otherwise considered. For example, in some instances, the IEEE std. 802.11 mc protocol may be utilized, at least in part, to obtain sufficiently accurate round trip-related measurements (e.g., RTT, etc.), such as via respective exchanges of multiple signal-related packets. Claimed subject matter is not limited to a particular standard or protocol, of course.

Continuing with the above discussion, TOA-related positioning, thus, may prove beneficial in terms of lowering network power and/or bandwidth consumption due, at least in part, to passive scanning, for example, and/or in terms of scalability due, at least in part, to a typically fixed network-related resource and/or time allocation regardless of a number of participating devices. At times, TOA-related positioning, however, may require more precise time synchronization (e.g., known clock bias) between access points and/or mobile devices. With respect to RTT-related positioning, more precise time synchronization may not be needed or useful, but RTS/CTS message exchanges may, for example, result in higher network-related power and/or bandwidth consumption due, at least in part, to active scanning. Thus, in some instances, RTS/CTS message exchanges may require more demanding resource and/or time allocation, as was indicated. Active and/or passive scanning techniques, such as to detect in-range wireless transmitters, for example, are generally known and need not be described here in greater detail. Accordingly, it may be desirable to develop one or more methods, systems, or apparatuses that may implement more robust positioning, such as in denser indoor or like environments, for example, by supplementing or supporting TOA/TDOA measurements with one or more selective or occasional RTT measurements of an RTS/CTS message exchange.

Thus, as will be discussed in greater detail below, an initial position of a mobile device may, for example, be determined based, at least in part, on an RTT measurement of an RTS/CTS message exchange with one or more proximate wireless transmitters, such as IEEE 802.11 std. Wi-Fi access points, just to illustrate one possible implementation. Based, at least in part, on an initial RTS/CTS message exchange, a bias between clocks maintained at a mobile device and at one or more applicable access points may, for example, be estimated. Using an estimated bias, a TOA of subsequently acquired beacon signal may, for example, be measured, and ranges to one or more applicable access points may be computed. Based, at least in part, on computed ranges, an initial position of a mobile device may, for example, be updated or refined, such as using one or more appropriate techniques (e.g., trilateration, triangulation, etc.). It should be noted that, in some instances, a TDOA may also be used, at least in part, or otherwise considered, such as instead of or in addition to TOA measurements, for example, as will also be seen.

As also discussed below, if an uncertainty of an initially estimated clock bias grows to exceed some threshold, another round of an RTS/CTS message exchange may, for example, be initiated or implemented, and the bias estimate may be corrected or determined anew so as to update a position fix accordingly. In some instances, a resource negotiation between a mobile device and associated wireless network, such as to facilitate or support scheduling of an RTS/CTS message exchange and time of flight-related measurements (e.g., TOA, TDOA, etc.), for example, may be performed, as will also be seen. As such, in some instances, using hybrid RTT and TOA/TDOA positioning, for example, a mobile device may be capable of obtaining a sufficiently accurate position fix in a denser environment, such as in a readily adaptable (e.g., via an RTS/CTS message frame, etc.), resource-efficient, and/or scalable (e.g., via a TOA beacon frame, etc.) manner, for example. In this context, uncertainties with respect to clock biases and/or position fixes typically refer to error estimates regarding some mutual synchronized timing reference and/or estimated locations, respectively. For example, a position estimate with a high accuracy has low uncertainty and vice versa. Such uncertainties are generally known and need not be described here in greater detail.

FIG. 1 is a schematic diagram illustrating features associated with an implementation of an example operating environment 100 capable of facilitating or supporting one or more processes or operations for hybrid RTT and TOA/TDOA positioning techniques for use in or with a mobile device, such as a location-aware mobile device 102, for example. It should be appreciated that operating environment 100 is described herein as a non-limiting example that may be implemented, in whole or in part, in the context of various electronic communications networks or combination of such networks, such as public networks (e.g., the Internet, the World Wide Web), private networks (e.g., intranets), wireless local area networks (WLAN, etc.), or the like. It should also be noted that claimed subject matter is not limited to indoor implementations. For example, at times, one or more operations or techniques described herein may be performed, at least in part, in an indoor-like environment, which may include partially or substantially enclosed areas, such as urban canyons, town squares, amphitheaters, parking garages, rooftop gardens, patios, or the like. At times, one or more operations or techniques described herein may be performed, at least in part, in an outdoor environment.

As illustrated, in an implementation, mobile device 102 may, for example, receive or acquire satellite positioning system (SPS) signals 104 from SPS satellites 106. In some instances, SPS satellites 106 may be from a single global navigation satellite system (GNSS), such as the GPS or Galileo satellite systems, for example. In other instances, SPS satellites 106 may be from multiple GNSS such as, but not limited to, GPS, Galileo, Glonass, or Beidou (Compass) satellite systems. In certain implementations, SPS satellites 106 may be from any one several regional navigation satellite systems (RNSS) such as, for example, WAAS, EGNOS, QZSS, just to name a few examples.

At times, mobile device 102 may, for example, transmit wireless signals to, or receive wireless signals from, a suitable wireless communication network. In one example, mobile device 102 may communicate with a cellular communication network, such as by transmitting wireless signals to, or receiving wireless signals from, a base station transceiver 108 over a wireless communication link 110, for example. Similarly, mobile device 102 may transmit wireless signals to, or receive wireless signals from a local transceiver 112 over a wireless communication link 114. Base station transceiver 108, local transceiver 112, etc. may be of the same or similar type, for example, or may represent different types of devices, such as access points, radio beacons, cellular base stations, femtocells, or the like, depending on an implementation. In some instances local transceiver 112 may comprise, for example, a wireless transmitter or receiver capable of transmitting or receiving wireless signals.

In a particular implementation, local transceiver 112 may be capable of communicating with mobile device 102 at a shorter range over wireless communication link 114 than at a range established via base station transceiver 108 over wireless communication link 110. For example, local transceiver 112 may be positioned in an indoor or like environment and may provide access to a wireless local area network (WLAN, e.g., IEEE Std. 802.11 network, etc.) or wireless personal area network (WPAN, e.g., Bluetooth® network, etc.). As was indicated, at times, an indoor or like environment associated with local transceiver 112 may comprise, for example, a denser environment where multiple mobile devices receive service from local transceiver 112, which may consume uplink and/or downlink resources, create or contribute to wireless traffic congestion, tax available bandwidth, or the like. In another example implementation, local transceiver 112 may comprise a femtocell capable of facilitating communication via link 114 according to an applicable cellular or like wireless communication protocol. Of course, it should be understood that these are merely examples of networks that may communicate with mobile device 102 over a wireless link, and claimed subject matter is not limited in this respect. For example, in some instances, operating environment 100 may include a larger number of base station transceivers 108, local transceivers 112, etc.

In an implementation, base station transceiver 108, local transceiver 112, etc. may communicate with servers 116, 118, or 120 over a network 122 via one or more links 124. Network 122 may comprise, for example, any combination of wired or wireless communication links. In a particular implementation, network 122 may comprise, for example, Internet Protocol (IP)-type infrastructure capable of facilitating or supporting communication between mobile device 102 and one or more servers 116, 118, 120, etc. via local transceiver 112, base station transceiver 108, etc. In another implementation, network 122 may comprise, for example cellular communication network infrastructure, such as a base station controller or master switching center to facilitate or support mobile cellular communication with mobile device 102. As discussed below, in some instances, network 122 may facilitate or support a resource negotiation between mobile device 102 and local transceiver 112, base station transceiver 108, etc., such as for scheduling of an RTS/CTS message exchange and time of flight-related measurements (e.g., TOA, TDOA, etc.), for example. Servers 116, 118, and/or 120 may comprise any suitable servers or combination thereof capable of facilitating or supporting one or more operations or techniques discussed herein. For example, servers 116, 118, or 120 may comprise one or more positioning assistance servers, navigation servers, map servers, crowdsourcing servers, network-related servers, or the like.

In particular implementations, and as also discussed below, mobile device 102 may have circuitry or processing resources capable of computing a position fix or estimated location of mobile device 102, initial or otherwise. For example, mobile device 102 may compute a position fix based, at least in part, on pseudorange measurements to four or more SPS satellites 106. Here, mobile device 102 may compute such pseudorange measurements based, at least in part, on pseudonoise code phase detections in signals 104 acquired from four or more SPS satellites 106. In particular implementations, mobile device 102 may receive from one or more servers 116, 118, or 120 positioning assistance data to aid in the acquisition of signals 104 transmitted by SPS satellites 106 including, for example, almanac, ephemeris data, Doppler search windows, just to name a few examples.

In some implementations, mobile device 102 may obtain a position fix by processing wireless signals received from one or more terrestrial transmitters positioned at known locations (e.g., base station transceiver 108, local transceiver 112, etc.) using any one of several techniques, such as, for example, AFLT, observed time difference of arrival (OT-DOA), or the like. In these techniques, a range from mobile device 102 may, for example, be measured to three or more of terrestrial transmitters based, at least in part, on one or more reference signals transmitted by these transmitters and received at mobile device 102, as was indicated. Here, servers 116, 118, or 120 may be capable of providing positioning assistance data to mobile device 102 including, for example, locations, identities, orientations, etc. of terrestrial transmitters to facilitate one or more suitable positioning techniques (e.g., AFLT, OTDOA, etc.). At times, servers 116, 118, or 120 may include, for example, a base station almanac (BSA) indicating locations, identities, orientations, etc. of cellular base stations (e.g., base station transceiver 108, local transceiver 112, etc.) in one or more particular areas or regions associated with operating environment 100.

As alluded to previously, in particular environments, such as indoor or like environments (e.g., urban canyons, etc.), mobile device 102, servers 116, 118, or 120, etc. may not be capable of acquiring or processing signals 104 from a sufficient number of SPS satellites 106 so as to perform a suitable positioning technique. Thus, optionally or alternatively, mobile device 102 may be capable of computing a position fix, initial or otherwise, based, at least in part, on signals acquired from one or more local transmitters, such as femtocells, Wi-Fi access points, or the like. For example, mobile device 102 may obtain a position fix by measuring ranges to three or more local transceivers 112 positioned at known locations. In some implementations, mobile device 102 may, for example, measure ranges by obtaining a MAC address from local transceiver 112, estimated bias between clocks maintained at mobile device 102 and local transceiver 112, and applicable time of flight-related measurements, as will also be seen.

In an implementation, mobile device 102 may, for example, receive positioning assistance data for one or more indoor positioning operations from servers 116, 118, or 120. At times, positioning assistance data may include, for example, locations, identities, orientations, etc. of one or more local transceivers 112, base station transceivers 108, etc. positioned at known locations for measuring ranges to these transmitters based, at least in part, on an RTT, TOA, TDOA, etc., or any combination thereof. In some instances, positioning assistance data to aid indoor positioning operations may include, for example, radio heat maps, context parameter maps, routeability graphs, etc., just to name a few examples. Other assistance data received by mobile device 102 may include, for example, electronic digital maps of indoor or like areas for display or to aid in navigation. A map may be provided to mobile device 102 as it enters a particular area, for example, and may show applicable features such as doors, hallways, entry ways, walls, etc., points of interest, such as bathrooms, pay phones, room names, stores, or the like. By obtaining a digital map of an indoor or like area of interest, mobile device 102 may, for example, be capable of overlaying its current location over the displayed map of the area so as to provide an associated user with additional context, frame of reference, or the like. The terms "positioning assistance data" and "navigation assistance data" may be used interchangeably herein.

According to an implementation, mobile device 102 may access indoor navigation assistance data via servers 116, 118, or 120 by, for example, requesting such data through selection of a universal resource locator (URL). In particular implementations, servers 116, 118, or 120 may be capable of providing indoor navigation assistance data to cover many different indoor areas including, for example, floors of buildings, wings of hospitals, terminals at an airport, portions of a university campus, areas of a large shopping mall, just to name a few examples. Also, if memory or data transmission resources at mobile device 102 make receipt of indoor positioning assistance data for all areas served by servers 116, 118, or 120 impractical or infeasible, a request for such data from mobile device 102 may, for example, indicate a rough or course estimate of a location of mobile device 102. Mobile device 102 may then be provided indoor navigation assistance data covering, for example, one or more areas including or proximate to a roughly estimated location of mobile device 102. In some instances, one or more servers 116, 118, or 120 may facilitate or support scheduling of an RTS/CTS message exchange and time of flight-related measurements, and may provide such a schedule to mobile device 102 as part of positioning assistance data, for example.

Even though a certain number of computing platforms or devices are illustrated herein, any number of suitable computing platforms or devices may be implemented to facilitate or support one or more techniques or processes associated with operating environment 100. For example, at times, network 122 may be coupled to one or more wired or wireless communication networks (e.g., WLAN, etc.) so as to enhance a coverage area for communications with mobile device 102, one or more base station transceivers 108, local transceiver 112, servers 116, 118, 120, or the like. In some instances, network 122 may facilitate or support femtocellased operative regions of coverage, for example. Again, these are merely example implementations, and claimed subject matter is not limited in this regard.

Figure 2:
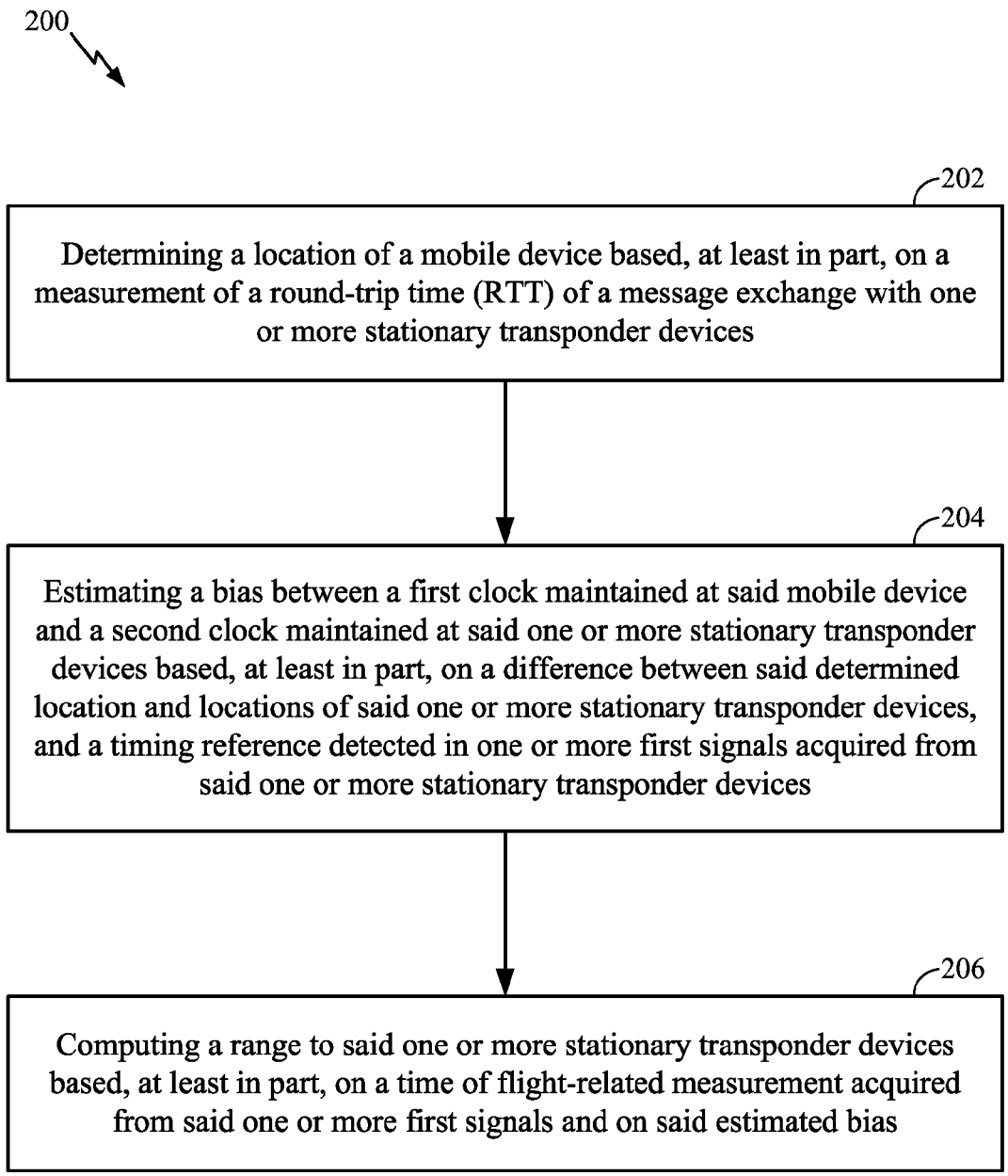
FIG. 2 is a flow diagram illustrating an implementation of an example process that may be performed to facilitate or support hybrid RTT and TOA/TDOA positioning.

With this in mind, attention is now drawn to FIG. 2, which is a flow diagram illustrating an implementation of an example process 200 that may be performed, in whole or in part, to facilitate or support one or more operations or techniques for hybrid RTT and TOA/TDOA positioning for use in or with a location-aware mobile device, such as mobile device 102 of FIG. 1, for example. It should be noted that information acquired or produced, such as, for example, input signals, output signals, operations, results, etc. associated with example process 200 may be represented via one or more digital signals. It should also be appreciated that even though one or more operations are illustrated or described concurrently or with respect to a certain sequence, other sequences or concurrent operations may be employed. In addition, although the description below references particular aspects or features illustrated in certain other figures, one or more operations may be performed with other aspects or features.

Example process 200 may, for example, begin at operation 202 with determining a location of a mobile device based, at least in part, on a measurement of a round-trip time (RTT) of a message exchange with one or more stationary transponder devices. As was indicated, in at least one implementation, one or more stationary transponder devices may comprise, for example, IEEE 802.11 std. Wi-Fi access points or like wireless transmitters, including short-range wireless transmitters (Bluetooth®, Zigbee®, etc.), positioned at known fixed locations within an indoor or like environment. Claimed subject matter is not limited to a particular wireless transmitter, of course. Here, a mobile device may, for example, measure a signal RTT to an access point by transmitting an IEEE std. 802.11 probe request, such as via an RTS data frame, and measuring a time until receipt of a response message, such as via a CTS data frame transmitted in response to receipt of the RTS frame. As was indicated, an access point may have a uniquely assigned MAC address, which may be included in a response message, for example. A MAC address may be decoded at or by a mobile device, such as by demodulating an acquired wireless signal, for example, and may be used, at least in part, to obtain an access point's location, among other things. Based, at least in part, on a measured RTT (and an access point's location, etc.), respective ranges to requisite access points may be computed, for example, and an initial location of a mobile device may be determined using one or more appropriate techniques (e.g., trilateration, triangulation, etc.), as discussed above.

With regard to operation 204, a bias between a first clock maintained at the mobile device and a second clock maintained at the one or more stationary transponder devices (e.g., Wi-Fi access points, etc.) may, for example, be estimated based, at least in part, on a difference between the initially determined location and locations of the one or more stationary transponder devices, and a timing reference detected in one or more first signals acquired from the one or more stationary transponder devices. As discussed above, in some instances, clocks of access points and target mobile devices may not be synchronized, meaning that a first clock maintained at a mobile device and a second clock maintained at an access point may differ by an unknown bias. As such, it may be difficult or, at times, impossible for a mobile device to estimate or compute its range to a proximate wireless transmitter with sufficient accuracy, such as to facilitate or support a requisite positioning operation, for example, based, at least in part on a TOA measurement in a transmitted beacon signal. Thus, in some instances, for more accurate or sufficient TOA-related range computation, knowledge of such a bias may, for example, be needed or otherwise useful. Accordingly, in at least one implementation, a bias between a first clock maintained at a mobile device and a second clock maintained at one or more stationary transponder devices (e.g., Wi-Fi access points, etc.) may, for example, be estimated as:

$$\text{ClkBias}(i) = TOA\text{range} - \|AP \text{ loc} - \text{est. mobile device loc}\|,$$

where ClkBias(i) denotes a clock bias for the i-th access point; TOA range denotes a range according to a synchronized timing reference detected in a transmitted TOA beacon signal; AP loc and est. mobile device loc denote a known location of an access point and a location of a mobile device estimated via a measurement of an RTT of an RTS/CTS message exchange, respectively.

At operation 206, a range to the one or more stationary transponder devices (e.g., Wi-Fi access points, etc.) may, for example, be computed based, at least in part, on a time of flight-related measurement acquired from the one or more first signals and on the estimated bias. Here, a range may, for example, be computed anew or updated, such as if a mobile device continues to travel or navigate within an indoor or like environment. As previously mentioned, in at least one implementation, a time of flight-related measurement may comprise, for example, a TOA measurement of a beacon signal transmitted by an access point to announce its presence in an area. Claimed subject matter is not so limited, of course. For example, in some instances, a TDOA of signals emitted from multiple reference access points may be used, at least in part, or otherwise considered, as was also indicated. In such a case, rather than a clock bias for the i-th access point, a clock bias difference between reference access points dClkBias(i,j) may, for example, be computed and utilized, at least in part, for range computation, such as in a similar manner using one or more appropriate TDOA techniques.

Thus, in an implementation, to update its position, such as while traveling within an indoor or like area, a mobile device may apply a previously estimated (e.g., at operation 204, etc.) bias in measuring a TOA of a subsequently acquired beacon signal relative to a clock maintained at a mobile device, and may compute a range to an applicable access point based, at least in part, on the measured TOA. Based, at least in part, on computed requisite ranges, an initial position of a mobile device (e.g., determined via an RTT measurement at operation 202, etc.) may, for example, be updated or refined, such as using one or more appropriate techniques (e.g., trilateration, triangulation, etc.). As such, in some instances, rather than refining or updating an initial position fix (e.g., while a mobile device travels within an indoor or like area, etc.) via operationally-expensive RTT measurements, which may tax available bandwidth and/or resources, for example, TOA, TDOA, or like measurements of subsequently acquired beacon signals may be used, at least in part. As was indicated, this may, for example, prove beneficial in terms of lowering power and/or bandwidth consumption, improving resource efficiency and/or network scalability, or the like.

As alluded to previously, clocks maintained at participating devices on a wireless communications network (e.g., network 122 of FIG. 1, etc.) may drift over time. For example, a bias between a clock maintained at a mobile device and a clock maintained at an access point may gradually increase, thus, imparting an uncertainty in a previously estimated (e.g., at operation 204, etc.) bias and, thus, a position fix. This, in turn, may limit or affect in some manner TOA-related positioning accuracy of a mobile device continually moving or traveling within an indoor or like environment. Clock drifts may also make subsequent TOA-related location estimates prone to degradation, for example, since the deviation in the position fix may grow significantly with time. Accordingly, at times, a mobile device may, for example, quantify this uncertainty as a function of time. As was indicated, a mobile device may, for example, use a previously estimated bias for measuring a TOA of a beacon signal subsequently acquired from an access point. If an uncertainty of a previously estimated bias grows to exceed some threshold, a mobile device may, for example, initiate another round of RTS/CTS message exchange for measuring RTT, and may estimate the bias again (or correct it, if appropriate), such as using one or more techniques discussed above.

Thus, continuing with the above discussion, a mobile device may, for example, estimate an uncertainty in a previously estimated bias based, at least in part, on a time since a most recent estimate of the bias. For example, a mobile device may estimate an uncertainty in a previously estimated bias every 1.0 minute, every 1.5 minutes, etc., just to illustrate a few possible implementations. In response to an estimated uncertainty exceeding some threshold, a mobile device may, for example, initiate another round of an RTS/CTS message exchange with measuring a signal's RTT, as discussed above. An estimated uncertainty threshold may be determined, at least in part, experimentally and may be pre-defined or configured, for example, or otherwise dynamically defined in some manner, depending on a particular application, environment, mobile device, access point, or the like. By way of example but not limitation, in one particular simulation or experiment, it appeared that an estimated uncertainty threshold between 10.0 and 20.0 meters may prove beneficial for obtaining a more accurate or sufficient position fix in denser indoor or like environments, such as in connection with a hybrid RTT and TOA/TDOA positioning. Of course, details relating to estimating an uncertainty in a previously estimated bias or to an estimated uncertainty threshold are merely examples to which claimed subject matter is not limited.

Figure 4:
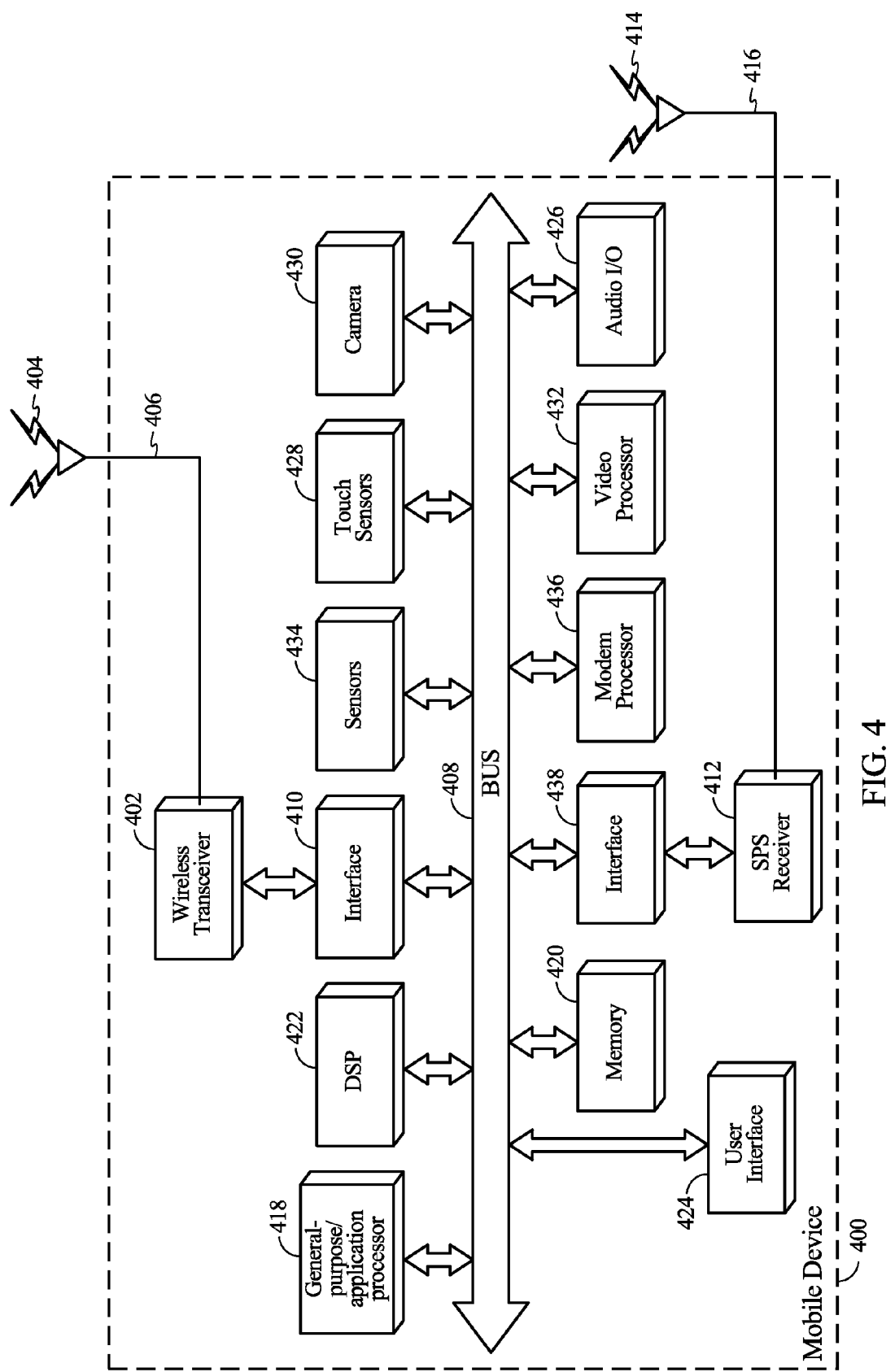
FIG. 4 is a schematic diagram illustrating an implementation of an example computing environment associated with a mobile device.

Likewise, here, a bias between clocks maintained at a mobile device and an applicable access point may, for example, be estimated based, at least in part, on a difference between estimated locations of the mobile device and the access point, and a timing reference detected in one or more subsequent TOA beacons, such as in a manner similar to bias estimation discussed above (e.g., at operation 204 of FIG. 4, etc.). Based, at least in part, on an estimated bias and a subsequently measured TOA, ranges to one or more applicable access points may, for example, be updated or computed. Based, at least in part, on updated or computed ranges, an initial position of a mobile device may, for example, be refined, such as using one or more appropriate techniques (e.g., trilateration, triangulation, etc.). As such, in some instances, by supplementing or supporting one or more TOA measurements with one or more selective or occasional RTT measurements, for example, a mobile device may sufficiently obtain and/or refine a position fix in a denser environment, such as in a readily adaptable, resource-efficient, and/or scalable manner.

Figure 3:
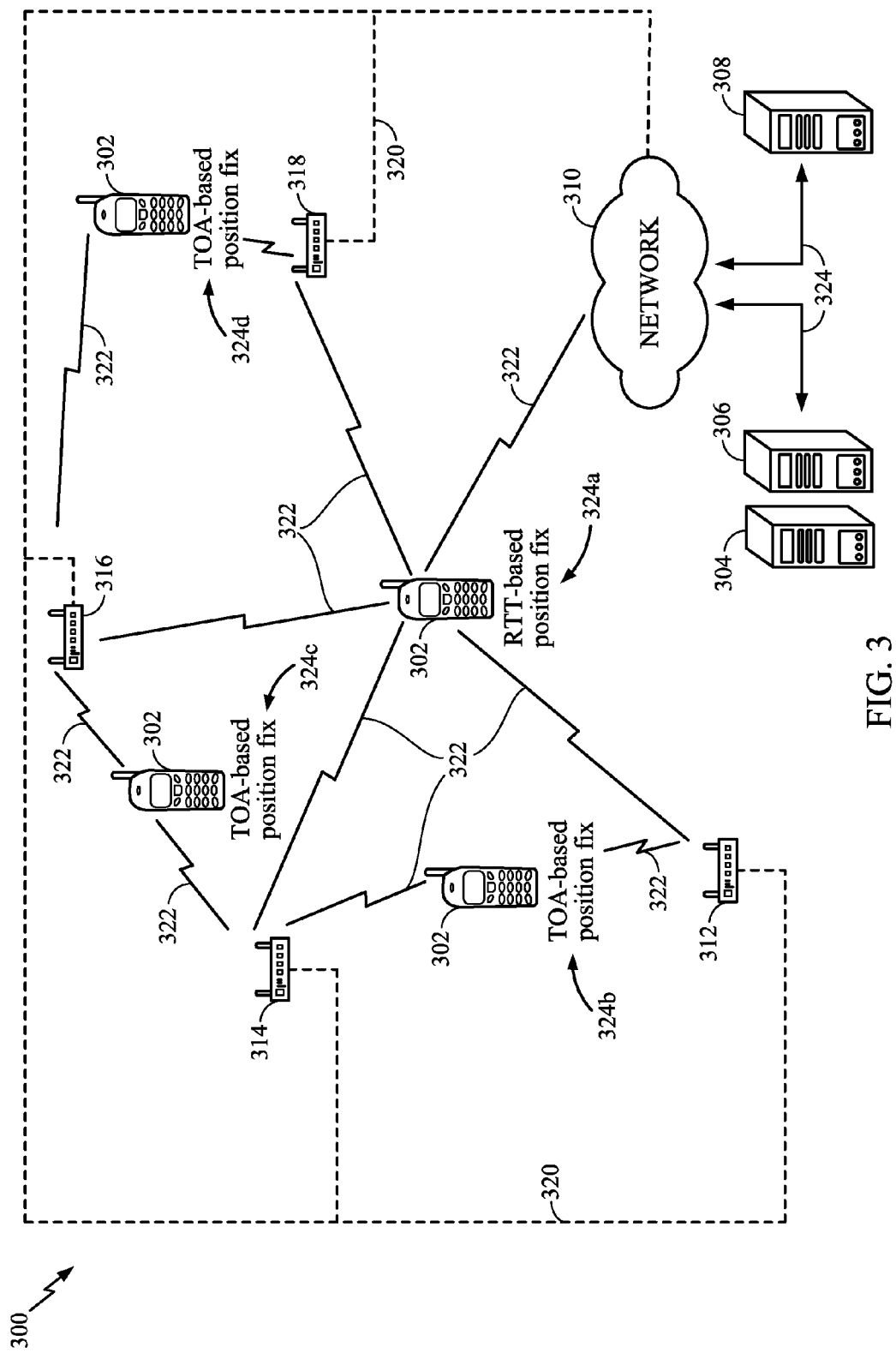
FIG. 3 is a schematic diagram of an implementation of a process illustrating an example use case of hybrid RTT and TOA/TDOA positioning.

For example, as illustrated in an implementation of an example use case or scenario 300 of FIG. 3, at times, a mobile device 302 may be located in an indoor or like environment in which satellite signals (e.g., signals 104 of FIG. 1) may not be reliably received or measured. In some instances, such an indoor or like environment may, for example, be associated with or include one or more features or aspects of operating environment 100 of FIG. 1. For example, mobile device 302 may correspond to or share common properties with mobile device 102 of FIG. 1, one or more servers 304, 306, and 308 may correspond to or share common properties with one or more servers 116, 118 and 120 of FIG. 1, a network 310 may correspond to or share common properties with network 122 of FIG. 1, wireless transmitters 312, 314, 316, and 318 may correspond to or share common properties with base station transceiver 108 and/or local transceiver 112 of FIG. 1, or the like. Likewise, here, even though a certain number of devices and/or networks are illustrated, any number of suitable devices and/or networks may be implemented to facilitate or support one or more techniques or processes discussed herein.

Here, wireless transmitters 312, 314, 316, and 318 may all be the same type of device or represent different types of devices, such as Wi-Fi access points, Bluetooth® access points, radio beacons, base transceiver stations, femtocells, GNSS pseudolites, etc. Although not shown, an associated indoor or like environment may be defined, for example, by a particular indoor or like area (e.g., a shopping mall, office space, etc.) comprising a number of entryways, hallways, cubicles, walls, dividers, staircases, doors, rooms, elevators, or the like. As indicated generally by a dashed line at 320, wireless transmitters 312, 314, 316, and 318 may be operatively coupled to network 310 that may comprise, for example, one or more wired or wireless communication links capable of making available or providing positioning assistance data to one or more associated mobile devices, as discussed above. As also illustrated generally via a number of links 322, mobile device may be in communication with one or more wireless transmitters 312, 314, 316, and 318, such as via RTS/CTS message exchanges, transmissions of beacon signals by one or more wireless transmitters 312, 314, 316, and 318 to announce their presence in an area, or the like. As also illustrated, at times, mobile device 302 may also communicate with network 310 directly. One or more servers 304, 306, and 308 may, for example, communicate with network 310 via links 324.

Thus, in operative use, mobile device 302 may, for example, determine its initial location, referenced via an RTT-based position fix at 324a, via measuring an RTT of a signal in an RTS/CTS message exchange, as was indicated. Having obtained RTT-based position fix 324a, mobile device 302 may, for example, estimate a bias between clocks maintained at mobile device 302 and one or more wireless transmitters 312, 314, 316, and 318 and may compute requisite ranges, such as utilizing one or more time of flight-related measurements, as discussed above. For example, mobile device 302 may refine or update RTT-based position fix 324a via a number of subsequent TOA-based position fixes, as progressively illustrated at 324b, 324c, and 324d, just to illustrate one possible TOA-based implementation.

By way of example but not limitation, in one particular simulation or experiment, it has been observed that, with respect to RTT positioning, for example, location and/or clock bias estimation accuracy may be constrained or limited to 5.0-10.0 meters, which may prove beneficial or otherwise sufficient in a denser indoor or like environment. As was also indicated, clocks at mobile device 302 and one or more wireless transmitters 312, 314, 316, and 318 may drift over time, however. Thus, if an uncertainty of a previously estimated bias grows to exceed some threshold, mobile device 302 may, for example, initiate another RTS/CTS message exchange for measuring RTT, and may estimate the bias again, such as using one or more techniques discussed above. Here, if, upon obtaining a number of consecutive TOA-based position fixes 324b, 324c, and 324d, an uncertainty grows to 10.0-20.0 meters, for example, another RTT-based position fix (not shown) may be implemented via an RTS/CTS message exchange so as to shrink or return the uncertainty back to 5.0-10.0 meters. By way of example but not limitation, it has also been observed that obtaining an RTT-based position fix every 1.0 minute, and refining or updating that position fix every 5.0 seconds using TOA beacon signals, such as in between RTT measurements, for example, may prove beneficial in denser indoor or like environments. Of course, these are merely example details relating to a particular use case or scenario of hybrid RTT and TOA positioning, and claimed subject matter is not so limited.

In at least one implementation, time of flight-related measurements obtained via one or more mobile devices located within a certain indoor or like environment, such as a particular venue, for example, may be advantageously shared in some manner between participating devices. For example, obtained measurements may be collected, such as in connection with a crowdsourcing server for a particular venue using one or more crowdsourcing techniques. To illustrate, venue patrons (e.g., mall shoppers, etc.) may, for example, execute desired tasks (e.g., collect TOA, TDOA, etc. measurements, estimated bias, etc., communicate measurements, bias, etc. to a crowdsourcing server, etc.) and be rewarded in some manner for doing so. Thus, in some instances, collected measurements may be subsequently provided or made available as part of positioning assistance data to or by one or more mobile devices located within that venue, such as to facilitate or support TOA/TDOA positioning and/or clock bias estimations, for example. At times, this may, for example, help to reduce or space further apart a number of operationally-expensive RTS/CTS exchange messages (e.g., to 2.0, etc. minutes instead of 1.0, etc. minute) while lowering position uncertainty, increasing TOA positioning accuracy, improving scalability, etc. Optionally or alternatively, collected measurements, estimated bias, etc. may, for example, be used, at least in part, by a network-related server and/or mobile device to adjust or improve timing of RTS/CTS message exchanges within a venue, adjust or improve clock offsets of associated wireless transmitters (e.g., synchronize Wi-Fi access points and/or mobile devices, etc.), or the like. For example, at times, an applicable server may collect estimates of a bias from one or more participating mobile devices and may provide or otherwise make available such estimates to these or other mobile devices associated with an indoor or like environment as part of positioning assistance data, such as to facilitate or support range computations via one or more techniques discussed herein.

As was also indicated, in an implementation, a resource negotiation between a mobile device and associated wireless network, such as to facilitate or support scheduling of an RTS/CTS message exchange and one or more time of flight-related measurements, for example, may be performed. For example, in some instances, a resource negotiation may be performed, at least in part, at or upon entry of a mobile device of an indoor or like area of interest, such as a shopping mall, stadium, or the like. Here, upon entry, a mobile device may, for example, declare or announce its desired power budget and/or positioning accuracy within an area, such as high power/high accuracy or low power/low accuracy, just to name a few examples. A power budget may depend, for example, on a battery's state of charge, reserve capacity, discharge rate, cell phone model, or the like. Positioning accuracy may depend, for example, on expectations of users with respect to degrees of granularity and/or accuracy of tracking information in a particular setting, desired frequency of location updates, capability of a navigation, tracking, etc. application hosted on a mobile device, or the like. For example, while for some users a rough position estimate and/or less frequent position update may be sufficient, such as if a user is trying to locate a store, restaurant, bar, etc., others may require more accurate location information and/or more frequent location update, such as those for car or pedestrian navigation. Of course, claimed subject matter is not so limited.

A mobile device may make a declaration or announcement regarding a desired power budget and/or positioning accuracy within an area by transmitting an encoded signal to an associated wireless communications network via one or more communication links, for example, utilizing any suitable data frame (e.g., as part of RTS/CTS message exchange, etc.). A network may then schedule RTS/CTS message exchanges and transmissions of beacon signals, such as discussed above, for example, and may communicate a schedule to an appropriate mobile device for implementation. In some instances, in scheduling RTS/CTS message exchanges and transmissions of beacon signals, a network may also take into account availability, operational capacity, placements, etc. of its own resources, such as by considering throughput rates of network-related Wi-Fi access points, femtocells, etc., a current number of mobile device users, availability of network-related bandwidth, or the like. As such, a resource negotiation between a mobile device and associated wireless network may, for example, prove beneficial for both the mobile device and network-related resources.

By way of example but not limitation, if availability of network-related resources is low, such as if a number of requisite Wi-Fi access points capable of facilitating or supporting one or more operations or techniques discussed herein is relatively small, for example, a schedule may provide for a longer interval between RTT measurements and a larger expected position uncertainty. If network-related resource availability is relatively high, however, a schedule may provide for shorter intervals between RTT measurements and a smaller expected position uncertainty. This may, for example, improve network-related load balancing (e.g., shortening TOA intervals with no or lesser impact on network-related resources, communications, etc.), power consumption of participating devices, etc., may anticipate user's expectations with respect to position accuracy, or the like. In some instances, an initial schedule may be re-negotiated, for example, based, at least in part, on an estimated level of position uncertainty, as one possible example. For example, if, while estimating a position of a mobile device via TOA measurements, a position uncertainty falls below some threshold (e.g., 20.0 meters, etc.), to improve accuracy, a mobile device may re-negotiate shorter intervals between RTT measurements, if desired, even if an initial schedule provided for longer RTT intervals. Likewise, if a position uncertainty is continually low (e.g., within 5.0 meters or less), for example, to save power, improve bandwidth, etc., a mobile device may re-negotiate a longer interval between RTT measurements. Intervals between RTT measurements may also be shortened if a mobile device comprises, for example, a premium (e.g., newer, with higher memory resources, battery life, etc.) mobile device, a mobile device associated with or subscribed to a premium plan or service, etc.

In some instances, such as if a mobile device deviates from an initial schedule in some manner, such as performs a larger number of RTT measurements than initially agreed upon, for example, an applicable server on a network may ask for a re-negotiation of the schedule. For example, a server may communicate with and/or ask one or more applicable access points to ignore or not respond to one or more RTS messages from such a mobile device. A server (e.g., via an applicable access point, etc.) may then follow up with a mobile device with a request for a re-negotiation. If a mobile device declines to accept such a request, a server may, for example, allow additional RTS/CTS messages or may limit RTC/CTS message exchanges to a previously-agreed schedule, which may depend, at least in part, on availability of network-related resources, make or model of a mobile device, service agreement, or the like. In some instances, such as if useable bandwidth in wireless communication links diminishes due, at least in part, to a large influx of wireless users, for example, a network may proactively request one or more associated mobile devices to re-negotiate their schedules. At times, a mobile device may not have an option to re-negotiate. For example, a network server may impose a new schedule, such as via transmitting a message announcing a change in a number or frequency of allowed RTS/CTS message exchanges, such as from every 2 min. to every 5 min., only three RTS/CTS message exchanges within 10 min., or the like. If availability of network-related resources increases or improves, an associated server may, for example remove previous restrictions, return to a previously negotiated schedule, ask anew for a desired power budget and/or positioning accuracy, offer to re-negotiate a new schedule, or the like. Of course, these are merely examples of a resource negotiation between a mobile device and associated wireless network, and claimed subject is not limited in this regard.

FIG. 4 is a schematic diagram of an implementation of an example computing environment associated with a mobile device that may be used, at least in part, to facilitate or support one or more operations or processes for hybrid RTT and TOA/TDOA positioning techniques. An example computing environment may comprise, for example, a mobile device 400 that may include one or more features or aspects of mobile device 102 of FIG. 1, mobile device 302 of FIG. 3, though claimed subject matter is not so limited. For example, in some instances, mobile device 400 may comprise a wireless transceiver 402 capable of transmitting or receiving wireless signals, referenced generally at 404, such as via an antenna 406 over a suitable wireless communications network. Wireless transceiver 402 may, for example, be capable of sending or receiving one or more suitable communications, such as one or more communications discussed with reference to FIGS. 1-3. Wireless transceiver 402 may, for example, be coupled or connected to a bus 408 via a wireless transceiver bus interface 410. Depending on an implementation, at times, wireless transceiver bus interface 410 may, for example, be at least partially integrated with wireless transceiver 402. Some implementations may include multiple wireless transceivers 402 or antennas 406 so as to enable transmitting or receiving signals according to a corresponding multiple wireless communication standards such as Wireless Local Area Network (WLAN) or Wi-Fi, Code Division Multiple Access (CDMA), Wideband-CDMA (W-CDMA), Long Term Evolution (LTE), Bluetooth®, just to name a few examples.

In an implementation, mobile device 400 may, for example, comprise an SPS or like receiver 412 capable of receiving or acquiring one or more SPS or other suitable wireless signals 414, such as via an SPS or like antenna 416. SPS receiver 412 may process, in whole or in part, one or more acquired SPS signals 414 for determining a location of mobile device 400. In some instances, one or more general-purpose application processors 418 (henceforth referred to as "processor"), memory 420, digital signal processor(s) (DSP) 422, or like specialized devices or processors not shown may be utilized to process acquired SPS signals 414, in whole or in part, calculate a location of mobile device 400, such as in conjunction with SPS receiver 412, or the like. Storage of SPS or other signals for implementing one or more positioning operations, such as in connection with one or more techniques for hybrid RTT and TOA/TDOA positioning, for example, may be performed, at least in part, in memory 420, suitable registers or buffers (not shown). Although not shown, it should be appreciated that in at least one implementation one or more processors 418, memory 420, DSPs 422, or like specialized devices or processors may comprise one or more processing modules capable of determining a location of mobile device 400 based, at least in part, on a measurement of a round-trip time (RTT) of a message exchange with one or more stationary transponder devices; estimating a bias between a first clock maintained at mobile device 400 and a second clock maintained at one or more stationary transponder devices based, at least in part, on a difference between the estimated location and locations of one or more stationary transponder devices, and a timing reference detected in one or more first signals acquired from one or more stationary transponder devices; and computing a range to one or more stationary transponder devices based, at least in part, on a time of flight-related measurement acquired from the one or more first signals and on the estimated bias.

It should be noted that all or part of one or more processing modules may be implemented using or otherwise including hardware, firmware, software, or any combination thereof. Processing modules may be representative of one or more circuits capable of performing at least a portion of information computing technique or process. By way of example but not limitation, processor 418 or DSP 422 may include one or more processors, controllers, microprocessors, microcontrollers, application specific integrated circuits, digital signal processors, programmable logic devices, field programmable gate arrays, or the like, or any combination thereof. Thus, at times, processor 418 or DSP 422 or any combination thereof may comprise or be representative of means for determining a location of a mobile device based, at least in part, on a measurement of a round-trip time (RTT) of a message exchange with one or more stationary transponder devices, such as to implement operation 202 of FIG. 2, at least in part. In addition, in at least one implementation, processor 418 or DSP 422 may be representative of or comprise, for example, means for estimating a bias between a first clock maintained at the mobile device and a second clock maintained at the one or more stationary transponder devices based, at least in part, on a difference between the estimated location and locations of the one or more stationary transponder devices, and a timing reference detected in one or more first signals acquired from the one or more stationary transponder devices, such as to implement operation 204 of FIG. 2, at least in part. Also, at times, processor 418 or DSP 422 may comprise, for example, or be representative of means for computing a range to one or more stationary transponder devices based, at least in part, on a time of flight-related measurement acquired from the one or more first signals and on the estimated bias, as illustrated in or described with respect to operation 206 of FIG. 2, for example.

As illustrated, DSP 422 may be coupled or connected to processor 418 and memory 420 via bus 408. Although not shown, in some instances, bus 408 may comprise one or more bus interfaces that may be integrated with one or more applicable components of mobile device 400, such as DSP 422, processor 418, memory 420, or the like. In various embodiments, one or more operations or functions described herein may be performed in response to execution of one or more machine-readable instructions stored in memory 420, such as on a computer-readable storage medium, such as RAM, ROM, FLASH, disc drive, etc., just to name a few examples. Instructions may, for example, be executable via processor 418, one or more specialized processors not shown, DSP 422, or the like. Memory 420 may comprise a non-transitory processor-readable memory, computer-readable memory, etc. that may store software code (e.g., programming code, instructions, etc.) that may be executable by processor 418, DSP 422, or the like to perform operations or functions described herein.

Mobile device 400 may comprise a user interface 424, which may include any one of several devices such as, for example, a speaker, microphone, display device, vibration device, keyboard, touch screen, etc., just to name a few examples. In at least one implementation, user interface 424 may enable a user to interact with one or more applications hosted on mobile device 400. For example, one or more devices of user interface 424 may store analog or digital signals on memory 420 to be further processed by DSP 422, processor 418, etc. in response to input or action from a user. Similarly, one or more applications hosted on mobile device 400 may store analog or digital signals in memory 420 to present an output signal to a user. In some implementations, mobile device 400 may optionally include a dedicated audio input/output (I/O) device 426 comprising, for example, a dedicated speaker, microphone, digital to analog circuitry, analog to digital circuitry, amplifiers, gain control, or the like. It should be understood, however, that this is merely an example of how audio I/O device 426 may be implemented, and that claimed subject matter is not limited in this respect. As seen, mobile device 400 may comprise one or more touch sensors 428 responsive to touching or like pressure applied on a keyboard, touch screen, or the like.

In an implementation, mobile device 400 may comprise, for example, a camera 440, dedicated or otherwise, such as for capturing still or moving imagery, or the like. Camera 440 may comprise, for example, a camera sensor or like imaging device (e.g., charge coupled device, complementary metal oxide semiconductor (CMOS)-type imager, etc.), lens, analog to digital circuitry, frame buffers, etc., just to name a few examples. In some instances, additional processing, conditioning, encoding, or compression of signals representing one or more captured images may, for example, be performed, at least in part, at processor 418, DSP 422, or the like. Optionally or alternatively, a video processor 432, dedicated or otherwise, may perform conditioning, encoding, compression, or manipulation of signals representing one or more captured images. Additionally, video processor 432 may, for example, decode or decompress one or more stored images for presentation on a display (not shown) of mobile device 400.

Mobile device 400 may comprise one or more sensors 434 coupled or connected to bus 408, such as, for example, one or more inertial sensors, ambient environment sensors, or the like. Inertial sensors of sensors 444 may comprise, for example, one or more accelerometers (e.g., collectively responding to acceleration of mobile device 400 in one, two, or three dimensions, etc.), gyroscopes or magnetometers (e.g., to support one or more compass or like applications, etc.), etc., just to illustrate a few examples. Ambient environment sensors of mobile device 400 may comprise, for example, one or more barometric pressure sensors, temperature sensors, ambient light detectors, camera sensors, microphones, etc., just to name few examples. Sensors 434 may generate analog or digital signals that may be stored in memory 420 and may be processed by DSP 422, processor 418, etc., such as in support of one or more applications directed to positioning or navigation operations, wireless communications, radio heat map learning, video gaming or the like.

In a particular implementation, mobile device 400 may comprise, for example, a modem processor 436, dedicated or otherwise, capable of performing baseband processing of signals received or downconverted via wireless transceiver 402, SPS receiver 412, or the like. Similarly, modem processor 436 may perform baseband processing of signals to be upconverted for transmission via wireless transceiver 402, for example. In alternative implementations, instead of having a dedicated modem processor, baseband processing may be performed, at least in part, by processor 418, DSP 422, or the like. In addition, in some instances, an interface 438, although illustrated as a separate component, may be integrated, in whole or in part, with one or more applicable components of mobile device 400, such as bus 408 or SPS receiver 412, for example. Optionally or alternatively, SPS receiver 412 may be coupled or connected to bus 408 directly. It should be understood, however, that these are merely examples of components or structures that may perform baseband processing, and that claimed subject matter is not limited in this regard.

Figure 5:
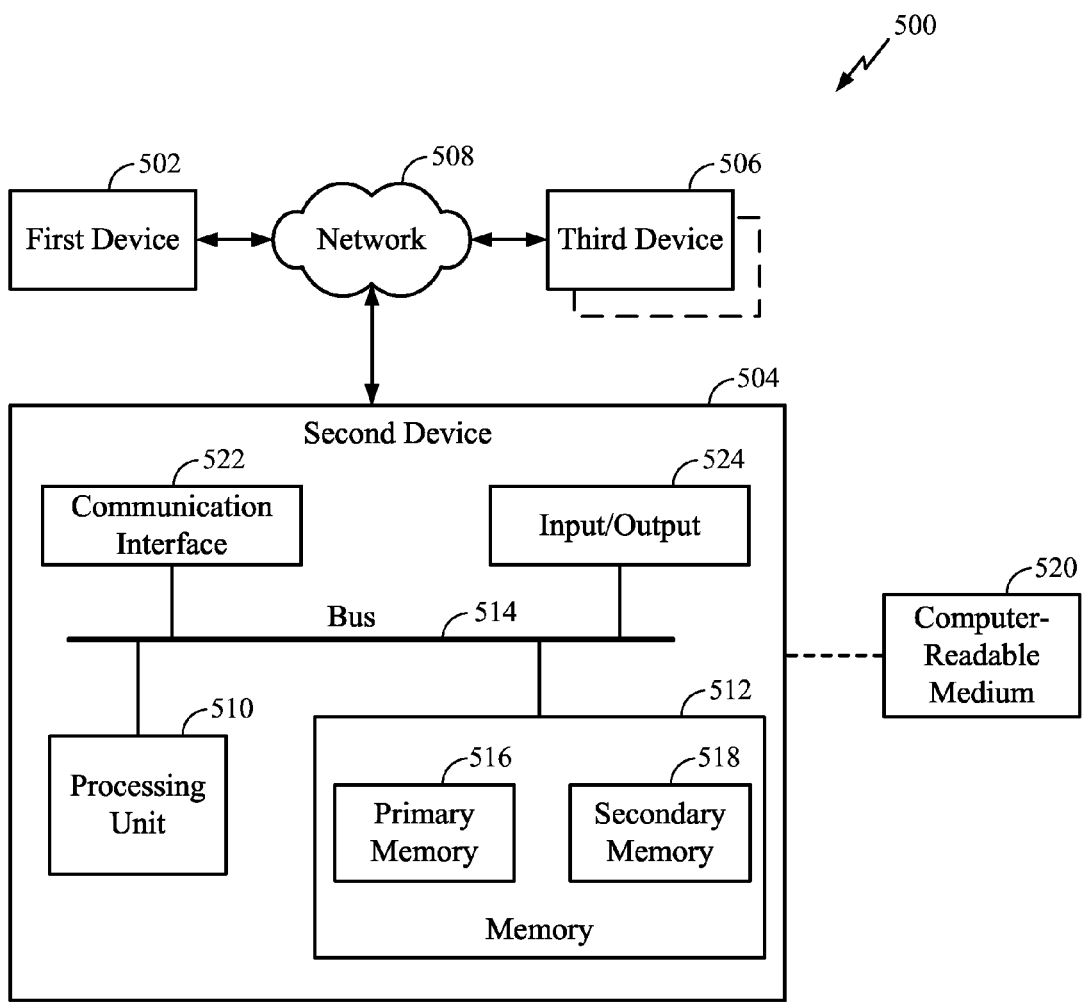
FIG. 5 is a schematic diagram illustrating an implementation of an example computing environment associated with a server.

FIG. 5 is a schematic diagram illustrating an implementation of an example computing environment or system 500 that may be associated with or include one or more servers or other devices capable of partially or substantially implementing or supporting one or more operations or processes for hybrid RTT and TOA/TDOA positioning techniques, such as discussed above in connection with FIGS. 1-3, for example. Computing environment 500 may include, for example, a first device 502, a second device 504, a third device 506, etc., which may be operatively coupled together via a communications network 508. In some instances, first device 502 may comprise a server capable of providing positioning assistance parameters, such as, for example, identities, locations, etc. of known wireless transmitters, radio heat map, base station almanac, electronic digital map, database of wireless transmitters, bias estimates, signal measurements, or the like. For example, first device 502 may also comprise a server capable of providing an electronic digital map to a mobile device based, at least in part, on a coarse or rough estimate of a location of the mobile device, upon request, or the like. First device 502 may also comprise a server capable of providing any other suitable positioning assistance parameters (e.g., an electronic digital map, radio heat map, etc.), relevant to a location of a mobile device. Second device 504 or third device 506 may comprise, for example, mobile devices, though claimed subject matter is not so limited. For example, in some instances, second device 504 may comprise a server functionally or structurally similar to first device 502, just to illustrate another possible implementation. In addition, communications network 508 may comprise, for example, one or more wireless transmitters, such as access points, femtocells, or the like. Of course, claimed subject matter is not limited in scope in these respects.

First device 502, second device 504, or third device 506 may be representative of any device, appliance, platform, or machine that may be capable of exchanging parameters and/or information over communications network 508. By way of example but not limitation, any of first device 502, second device 504, or third device 506 may include: one or more computing devices or platforms, such as, for example, a desktop computer, a laptop computer, a workstation, a server device, or the like; one or more personal computing or communication devices or appliances, such as, for example, a personal digital assistant, mobile communication device, or the like; a computing system or associated service provider capability, such as, for example, a database or information storage service provider/system, a network service provider/system, an Internet or intranet service provider/system, a portal or search engine service provider/system, a wireless communication service provider/system; or any combination thereof. Any of first, second, or third devices 502, 504, and 506, respectively, may comprise one or more of a mobile device, wireless transmitter or receiver, server, etc. in accordance with example implementations described herein.

In an implementation, communications network 508 may be representative of one or more communication links, processes, or resources capable of supporting an exchange of information between at least two of first device 502, second device 504, or third device 506. By way of example but not limitation, communications network 508 may include wireless or wired communication links, telephone or telecommunications systems, information buses or channels, optical fibers, terrestrial or space vehicle resources, local area networks, wide area networks, intranets, the Internet, routers or switches, and the like, or any combination thereof. As illustrated, for example, via a dashed lined box partially obscured by third device 506, there may be additional like devices operatively coupled to communications network 508. It is also recognized that all or part of various devices or networks shown in computing environment 500, or processes or methods, as described herein, may be implemented using or otherwise including hardware, firmware, software, or any combination thereof.

By way of example but not limitation, second device 504 may include at least one processing unit 510 that may be operatively coupled to a memory 512 via a bus 514. Processing unit 510 may be representative of one or more circuits capable of performing at least a portion of a suitable computing procedure or process. For example, processing unit 510 may include one or more processors, controllers, microprocessors, microcontrollers, application specific integrated circuits, digital signal processors, programmable logic devices, field programmable gate arrays, or the like, or any combination thereof. Although not shown, second device 504 may include a location-tracking unit that may initiate a position fix of a suitable mobile device, such as in an area of interest, for example, based, at least in part, on one or more received or acquired wireless signals, such as from an SPS, one or more Wi-Fi access points, etc. In some implementations, a location-tracking unit may be at least partially integrated with a suitable processing unit, such as processing unit 510, for example, though claimed subject matter is not so limited. In certain server-based or server-supported implementations, processing unit 510 may, for example, comprise means for determining a location of a mobile device based, at least in part, on a measurement of a round-trip time (RTT) of a message exchange with one or more stationary transponder devices, such as to facilitate or support operations 202, 204, and/or 206 of FIG. 2, at least in part. In some instances, processing unit 510 may, for example, comprise means for estimating a bias between a first clock maintained at the mobile device and a second clock maintained at the one or more stationary transponder devices based, at least in part, on a difference between the estimated location and locations of the one or more stationary transponder devices, and a timing reference detected in one or more first signals acquired from the one or more stationary transponder devices, such as to facilitate or support operations 202, 204, and/or 206 of FIG. 2, at least in part. Depending on an implementation, processing unit 510 may also comprise, for example, means for computing a range to the one or more stationary transponder devices based, at least in part, on a time of flight-related measurement acquired from the one or more first signals and on the estimated bias, such as to facilitate or support operations 202, 204, and/or 206 of FIG. 2, at least in part.

Memory 512 may be representative of any information storage mechanism or appliance. Memory 512 may include, for example, a primary memory 516 and a secondary memory 518. Primary memory 516 may include, for example, a random access memory, read only memory, etc. While illustrated in this example as being separate from processing unit 510, it should be understood that all or part of primary memory 516 may be provided within or otherwise co-located/coupled with processing unit 510. Secondary memory 518 may include, for example, same or similar type of memory as primary memory or one or more information storage devices or systems, such as, for example, a disk drive, an optical disc drive, a tape drive, a solid state memory drive, etc. In certain implementations, secondary memory 518 may be operatively receptive of, or otherwise configurable to couple to, a computer-readable medium 520. Computer-readable medium 520 may include, for example, any non-transitory storage medium that may carry or make accessible information, code, or instructions for one or more of devices in computing environment 500. Computer-readable medium 520 may also be referred to as a machine-readable medium, storage medium, or the like.

Second device 504 may include, for example, a communication interface 522 that may provide for or otherwise support an operative coupling of second device 504 to at least communications network 508. By way of example but not limitation, communication interface 522 may include a network interface device or card, a modem, a router, a switch, a transceiver, and the like. Second device 504 may also include, for example, an input/output device 524. Input/output device 524 may be representative of one or more devices or features that may be configurable to accept or otherwise introduce human or machine inputs, or one or more devices or features that may be capable of delivering or otherwise providing for human or machine outputs. By way of example but not limitation, input/output device 524 may include an operatively configured display, speaker, keyboard, mouse, trackball, touch screen, information port, or the like.

The methodologies described herein may be implemented by various means depending upon applications according to particular examples. For example, such methodologies may be implemented in hardware, firmware, software, or combinations thereof. In a hardware implementation, for example, a processing unit may be implemented within one or more application specific integrated circuits ("ASICs"), digital signal processors ("DSPs"), digital signal processing devices ("DSPDs"), programmable logic devices ("PLDs"), field programmable gate arrays ("FPGAs"), processors, controllers, micro-controllers, microprocessors, electronic devices, other devices units de-signed to perform the functions described herein, or combinations thereof.

Algorithmic descriptions and/or symbolic representations are examples of techniques used by those of ordinary skill in the signal processing and/or related arts to convey the substance of their work to others skilled in the art. An algorithm is here, and generally, is considered to be a self-consistent sequence of operations and/or similar signal processing leading to a desired result. In this context, operations and/or processing involve physical manipulation of physical quantities. Typically, although not necessarily, such quantities may take the form of electrical and/or magnetic signals and/or states capable of being stored, transferred, combined, compared, processed or otherwise manipulated as electronic signals and/or states representing various forms of content, such as signal measurements, text, images, video, audio, etc. It has proven convenient at times, principally for reasons of common usage, to refer to such physical signals and/or physical states as bits, values, elements, symbols, characters, terms, numbers, numerals, measurements, messages, parameters, frames, packets, content and/or the like. It should be understood, however, that all of these and/or similar terms are to be associated with appropriate physical quantities or manifestations, and are merely convenient labels. Unless specifically stated otherwise, as apparent from the preceding discussion, it is appreciated that throughout this specification discussions utilizing terms such as "processing," "computing," "calculating," "determining", "establishing", "obtaining", "identifying", "selecting", "generating", and/or the like may refer to actions and/or processes of a specific apparatus, such as a special purpose computer and/or a similar special purpose computing and/or network device. In the context of this specification, therefore, a special purpose computer and/or a similar special purpose computing and/or network device is capable of processing, manipulating and/or transforming signals and/or states, typically represented as physical electronic and/or magnetic quantities within memories, registers, and/or other storage devices, transmission devices, and/or display devices of the special purpose computer and/or similar special purpose computing and/or network device. In the context of this particular patent application, as mentioned, the term "specific apparatus" may include a general purpose computing and/or network device, such as a general purpose computer, once it is programmed to perform particular functions pursuant to instructions from program software.

In some circumstances, operation of a memory device, such as a change in state from a binary one to a binary zero or vice-versa, for example, may comprise a transformation, such as a physical transformation. Likewise, operation of a memory device to store bits, values, elements, symbols, characters, terms, numbers, numerals, measurements, messages, parameters, frames, packets, content and/or the like may comprise a physical transformation. With particular types of memory devices, such a physical transformation may comprise a physical transformation of an article to a different state or thing. For example, but without limitation, for some types of memory devices, a change in state may involve an accumulation and/or storage of charge or a re-lease of stored charge. Likewise, in other memory devices, a change of state may comprise a physical change, such as a transformation in magnetic orientation and/or a physical change and/or transformation in molecular structure, such as from crystalline to amorphous or vice-versa. In still other memory devices, a change in physical state may involve quantum mechanical phenomena, such as, superposition, entanglement, and/or the like, which may involve quantum bits (qubits), for example. The foregoing is not intended to be an exhaustive list of all examples in which a change in state form a binary one to a binary zero or vice-versa in a memory device may comprise a transformation, such as a physical transformation. Rather, the foregoing is intended as illustrative examples.

Wireless communication techniques described herein may be in connection with various wireless communications networks such as a wireless wide area network ("WWAN"), a wireless local area network ("WLAN"), a wireless personal area network (WPAN), and so on. The term "network" and "system" may be used interchangeably herein. A WWAN may be a Code Division Multiple Access ("CDMA") network, a Time Division Multiple Access ("TDMA") network, a Frequency Division Multiple Access ("FDMA") network, an Orthogonal Frequency Division Multiple Access ("OFDMA") net-work, a Single-Carrier Frequency Division Multiple Access ("SC-FDMA") network, or any combination of the above networks, and so on. A CDMA network may implement one or more radio access technologies ("RATs") such as cdma2000, Wideband-CDMA ("W-CDMA"), to name just a few radio technologies. Here, cdma2000 may include technologies implemented according to IS-95, IS-2000, and IS-856 standards. A TDMA network may implement Global System for Mobile Communications ("GSM"), Digital Advanced Mobile Phone System ("D-AMPS"), or some other RAT. GSM and W-CDMA are described in documents from a consortium named "3rd Generation Partnership Project" ("3GPP"). Cdma2000 is described in documents from a consortium named "3rd Generation Partnership Project 2" ("3GPP2"). 3GPP and 3GPP2 documents are publicly available. 4G Long Term Evolution ("LTE") communications networks may also be implemented in accordance with claimed subject matter, in an aspect. A WLAN may comprise an IEEE 802.11x network, and a WPAN may comprise a Bluetooth network, an IEEE 802.15x, for example. Wireless communication implementations described herein may also be used in connection with any combination of WWAN, WLAN or WPAN.

In another aspect, as previously mentioned, a wireless transmitter or access point may comprise a femtocell, utilized to extend cellular telephone service into a business or home. In such an implementation, one or more mobile devices may communicate with a femtocell via a code division multiple access ("CDMA") cellular communication protocol, for example, and the femtocell may provide the mobile device access to a larger cellular telecommunication network by way of another broadband network such as the Internet.

Techniques described herein may be used with an SPS that includes any one of several GNSS and/or combinations of GNSS. Furthermore, such techniques may be used with positioning systems that utilize terrestrial transmitters acting as "pseudolites", or a combination of SVs and such terrestrial transmitters. Terrestrial transmitters may, for example, include ground-based transmitters that broadcast a PN code or other ranging code (e.g., similar to a GPS or CDMA cellular signal). Such a transmitter may be assigned a unique PN code so as to permit identification by a remote receiver. Terrestrial transmitters may be useful, for example, to augment an SPS in situations where SPS signals from an orbiting SV might be unavailable, such as in tunnels, mines, buildings, urban canyons or other enclosed areas. Another implementation of pseudolites is known as radio-beacons. The term "SV", as used herein, is intended to include terrestrial transmitters acting as pseudolites, equivalents of pseudolites, and possibly others. The terms "SPS signals" and/or "SV signals", as used herein, is intended to include SPS-like signals from terrestrial transmitters, including terrestrial transmitters acting as pseudolites or equivalents of pseudolites.

Likewise, in this context, the terms "coupled", "connected," and/or similar terms are used generically. It should be understood that these terms are not intended as synonyms. Rather, "connected" is used generically to indicate that two or more components, for example, are in direct physical, including electrical, contact; while, "coupled" is used generically to mean that two or more components are potentially in direct physical, including electrical, contact; however, "coupled" is also used generically to also mean that two or more components are not necessarily in direct contact, but nonetheless are able to co-operate and/or interact. The term coupled is also understood generically to mean indirectly connected, for example, in an appropriate context.

The terms, "and", "or", "and/or" and/or similar terms, as used herein, include a variety of meanings that also are expected to depend at least in part upon the particular context in which such terms are used. Typically, "or" if used to associate a list, such as A, B or C, is intended to mean A, B, and C, here used in the inclusive sense, as well as A, B or C, here used in the exclusive sense. In addition, the term "one or more" and/or similar terms is used to describe any feature, structure, and/or characteristic in the singular and/or is also used to describe a plurality and/or some other combination of features, structures and/or characteristics. Likewise, the term "based on" and/or similar terms are understood as not necessarily intending to convey an exclusive set of factors, but to allow for existence of additional factors not necessarily expressly described. Of course, for all of the foregoing, particular context of description and/or usage provides helpful guidance regarding inferences to be drawn. It should be noted that the following description merely provides one or more illustrative examples and claimed subject matter is not limited to these one or more examples; however, again, particular context of description and/or usage provides helpful guidance regarding inferences to be drawn.

In this context, the term network device refers to any device capable of communicating via and/or as part of a network and may comprise a computing device. While network devices may be capable of sending and/or receiving signals (e.g., signal packets and/or frames), such as via a wired and/or wireless network, they may also be capable of performing arithmetic and/or logic operations, processing and/or storing signals, such as in memory as physical memory states, and/or may, for example, operate as a server in various embodiments. Network devices capable of operating as a server, or otherwise, may include, as examples, dedicated rack-mounted servers, desktop computers, laptop computers, set top boxes, tablets, netbooks, smart phones, wearable devices, integrated devices combining two or more features of the foregoing devices, the like or any combination thereof. Signal packets and/or frames, for example, may be exchanged, such as between a server and a client device and/or other types of network devices, including between wireless devices coupled via a wireless network, for example. It is noted that the terms, server, server device, server computing device, server computing platform and/or similar terms are used interchangeably. Similarly, the terms client, client device, client computing device, client computing platform and/or similar terms are also used interchangeably. While in some instances, for ease of description, these terms may be used in the singular, such as by referring to a "client device" or a "server device," the description is intended to encompass one or more client devices and/or one or more server devices, as appropriate. Along similar lines, references to a "database" are understood to mean, one or more databases and/or portions thereof, as appropriate.

It should be understood that for ease of description a network device (also referred to as a networking device) may be embodied and/or described in terms of a computing device. However, it should further be understood that this description should in no way be construed that claimed subject matter is limited to one embodiment, such as a computing device and/or a network device, and, instead, may be embodied as a variety of devices or combinations thereof, including, for example, one or more illustrative examples.

References throughout this specification to one implementation, an implementation, one embodiment, an embodiment and/or the like means that a particular feature, structure, and/or characteristic described in connection with a particular implementation and/or embodiment is included in at least one implementation and/or embodiment of claimed subject matter. Thus, appearances of such phrases, for example, in various places throughout this specification are not necessarily intended to refer to the same implementation or to any one particular implementation described. Furthermore, it is to be understood that particular features, structures, and/or characteristics described are capable of being combined in various ways in one or more implementations and, therefore, are within intended claim scope, for example. In general, of course, these and other issues vary with context. Therefore, particular context of description and/or usage provides helpful guidance regarding inferences to be drawn.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all aspects falling within the scope of the appended claims, and equivalents thereof.

What is claimed is:

1. A method for location determination at a mobile device comprising:
   determining a location of said mobile device based, at least in part, on a measurement of a round-trip time (RTT) of a message exchange with one or more stationary transponder devices;
   estimating a bias between a first clock maintained at said mobile device and a second clock maintained at said one or more stationary transponder devices based, at least in part, on a difference between said determined location and locations of said one or more stationary transponder devices, and a timing reference detected in one or more first signals acquired from said one or more stationary transponder devices; and
   computing a range to said one or more stationary transponder devices based, at least in part, on a time of flight-related measurement acquired from said one or more first signals and on said estimated bias.

2. The method of claim 1, wherein said time of flight-related measurement comprises at least one of the following: a time of arrival (TOA) measurement; a time difference of arrival (TDOA) measurement; or any combination thereof.

3. The method of claim 1, and further comprising:
   estimating an uncertainty in said estimated bias based, at least in part, on a time since a most recent estimate of said bias; and
   in response to said estimated uncertainty exceeding a threshold:
      estimating said location of said mobile device based, at least in part, on a measurement of a subsequent RTT of a subsequent message exchange with said one or more stationary transponder devices; and
      estimating said bias between said first clock and said second clock based, at least in part, on a difference between said estimated location and locations of said one or more stationary transponder devices, and a timing reference detected in one or more third signals acquired from said one or more stationary transponder devices.

4. The method of claim 3, and further comprising updating said range to said one or more stationary transponder devices based, at least in part, on a time of flight-related measurement acquired from said one or more third signals and said estimated bias.

5. The method of claim 1, wherein said message exchange comprises a request-to-send/clear-to-send (RTS/CTS) message exchange.

6. The method of claim 1, and further comprising performing a resource negotiation between said mobile device and said one or more stationary transponder devices.

7. The method of claim 6, wherein said performing resource negotiation further comprises:
   declaring one or more of a desired power budget and positioning accuracy for said mobile device; and
   scheduling said measurement of said RTT and said time of flight-related measurement based, at least in part, on said one or more of said power budget and said positioning accuracy.

8. The method of claim 7, wherein said scheduling is further based, at least in part, on at least one of the following for said one or more stationary transponder devices: availability; operational capacity; location; or any combination thereof.

9. The method of claim 6, wherein said scheduling comprises scheduling a time interval between at least one of the following: two or more measurements of said RTT; two or more time of flight-related measurements; or any combination thereof.

10. The method of claim 6, and further comprising performing a resource re-negotiation between said mobile device and said one or more stationary transponder devices based, at least in part, on an estimated level of position uncertainty of said mobile device.

11. The method of claim 1, and further comprising:
   crowdsourcing time of flight-related measurements; and
   making available said crowdsourced measurements as part of positioning assistance data.

12. The method of claim 11, and further comprising:
   obtaining one or more additional estimates of a clock bias collected for synchronizing one or more of said one or more stationary transponder devices and said mobile device based, at least in part, on said crowdsourced time of flight-related measurements.

13. The method of claim 1, and further comprising:
   collecting estimates of said bias between said first clock maintained at said mobile device and said second clock maintained at said one or more stationary transponder devices; and
   communicating said estimates of said bias to a crowdsourcing server.

14. The method of claim 13, and further comprising obtaining a schedule for performing said measurement of said RTT and said time of flight-related measurement based, at least in part, on said communicated estimates of said bias.

15. The method of claim 1, wherein said timing reference comprises at least one of the following: a time of arrival (TOA)-related range; a time difference of arrival (TDOA)-related range; or any combination thereof.

16. The method of claim 1, wherein said one or more stationary transponder devices comprises one or more wireless local access network (WLAN) Wi-Fi access points.

17. An apparatus for location determination comprising:
means for determining a location of a mobile device based, at least in part, on a measurement of a round-trip time (RTT) of a message exchange with one or more stationary transponder devices;
means for estimating a bias between a first clock maintained at said mobile device and a second clock maintained at said one or more stationary transponder devices based, at least in part, on a difference between said determined location and locations of said one or more stationary transponder devices, and a timing reference detected in one or more first signals acquired from said one or more stationary transponder devices; and
means for computing a range to said one or more stationary transponder devices based, at least in part, on a time of flight-related measurement acquired from said one or more first signals and on said estimated bias.

18. The apparatus of claim 17, and further comprising:
means for estimating an uncertainty in said estimated bias based, at least in part, on a time since a most recent estimate of said bias; and
means for estimating, in response to said estimated uncertainty exceeding a threshold, said location of said mobile device based, at least in part, on a measurement of a subsequent RTT of a subsequent message exchange with said one or more stationary transponder devices; and
means for estimating said bias between said first clock and said second clock based, at least in part, on a difference between said estimated location and said locations of said one or more stationary transponder devices, and a timing reference detected in one or more third signals acquired from said one or more stationary transponder devices.

19. The apparatus of claim 17, and further comprising means for performing a resource negotiation or resource re-negotiation between said mobile device and said one or more stationary transponder devices.

20. An apparatus for location determination comprising:
a wireless transceiver to communicate with an electronic communications network; and
one or more processors coupled to a memory to:
determine a location of a mobile device based, at least in part, on a measurement of a round-trip time (RTT) of a message exchange with one or more stationary transponder devices;
estimate a bias between a first clock maintained at said mobile device and a second clock maintained at said one or more stationary transponder devices to be based, at least in part, on a difference between said determined location and locations of said one or more stationary transponder devices, and a timing reference detected in one or more first signals acquired from said one or more stationary transponder devices; and
compute a range to said one or more stationary transponder devices to be based, at least in part, on a time of flight-related measurement acquired from said one or more first signals and on said estimated bias.

21. The apparatus of claim 20, wherein said time of flight-related measurement to comprise at least one of the following: a time of arrival (TOA) measurement; a time difference of arrival (TDOA) measurement; or any combination thereof.

22. The apparatus of claim 20, wherein said one or more processors further to:

estimate an uncertainty in said estimated bias to be based, at least in part, on a time since a most recent estimate of said bias; and
in response to said estimated uncertainty exceeding a threshold:
estimate said location of said mobile device to be based, at least in part, on a measurement of a subsequent RTT of a subsequent message exchange with said one or more stationary transponder devices; and
estimate said bias between said first clock and said second clock to be based, at least in part, on a difference between said estimated location and said locations of said one or more stationary transponder devices, and a timing reference detected in one or more third signals acquired from said one or more stationary transponder devices.

23. The apparatus of claim 22, wherein said one or more processors further to update said range to said one or more stationary transponder devices to be based, at least in part, on a time of flight-related measurement acquired from said one or more third signals and said estimated bias.

24. The apparatus of claim 20, wherein said message exchange to comprise a request-to-send/clear-to-send (RTS/CTS) message exchange.

25. The apparatus of claim 20, wherein said one or more processors further to perform a resource negotiation between said mobile device and said one or more stationary transponder devices.

26. The apparatus of claim 25, wherein said one or more processors to said perform said resource negotiation further to:
declare one or more of a desired power budget and positioning accuracy for said mobile device; and
schedule said measurement of said RTT and said time of flight-related measurement to be based, at least in part, on said one or more of said power budget and said positioning accuracy.

27. The apparatus of claim 26, wherein to said schedule is to be based, at least in part, on at least one of the following for said one or more stationary transponder devices: availability; operational capacity; location; or any combination thereof.

28. The apparatus of claim 25, wherein said one or more processors to said schedule said measurement of said RTT and said time of flight-related measurement to schedule a time interval between at least one of the following: two or more measurements of said RTT; two or more time of flight-related measurements; or any combination thereof.

29. The apparatus of claim 25, wherein said one or more processors further to perform a resource re-negotiation between said mobile device and said one or more stationary transponder devices to be based, at least in part, on an estimated level of position uncertainty of said mobile device.

30. The apparatus of claim 20, wherein said one or more processors further to:
crowdsource time of flight-related measurements; and
make available said crowdsourced measurements as part of positioning assistance data.

31. The apparatus of claim 30, wherein said one or more processors further to:
obtain additional estimates of a clock bias collected to synchronize one or more of said one or more stationary transponder devices and said mobile device to be based, at least in part, on said crowdsourced time of flight-related measurements.

32. The apparatus of claim 20, wherein said one or more processors further to:
- collect estimates of said bias between said first clock maintained at said mobile device and said second clock maintained at said one or more stationary transponder devices; and
- communicate said estimates of said bias to a crowdsourcing server.

33. The apparatus of claim 32, wherein said wireless transceiver further to obtain a schedule to perform said measurement of said RTT and said time of flight-related measurement to be based, at least in part, on said communicated estimates of said bias.

34. The apparatus of claim 20, wherein said timing reference to comprise at least one of the following: a time of arrival (TOA)-related range; a time difference of arrival (TDOA)-related range; or any combination thereof.

35. A non-transitory storage medium having instructions executable by a processor to:
- determine a location of a mobile device based, at least in part, on a measurement of a round-trip time (RTT) of a message exchange with one or more stationary transponder devices;
- estimate a bias between a first clock maintained at said mobile device and a second clock maintained at said one or more stationary transponder devices based, at least in part, on a difference between said determined location and locations of said one or more stationary transponder devices, and a timing reference detected in one or more first signals acquired from said one or more stationary transponder devices; and
- compute a range to said one or more stationary transponder devices based, at least in part, on a time of flight-related measurement acquired from said one or more first signals and on said estimated bias.

36. A method for location determination at a server device comprising:
- collecting estimates of a bias between a first clock maintained at a first mobile device and a second clock maintained at one or more stationary transponder devices, said bias being determined based, at least in part, on a difference between a location of said first mobile device and locations of said one or more stationary transponder devices, and a timing reference detected in one or more signals acquired from said one or more stationary transponder devices; and
- making available said estimates of said bias as part of positioning assistance data for computing a range from said first mobile device or one or more other mobile devices to said one or more stationary transponder devices based, at least in part, on a time of flight-related measurement acquired from said one or more signals and on said estimates of said bias.

37. The method of claim 36, and further comprising scheduling a message exchange and said time of flight-related measurement based, at least in part, on said collected estimates of said bias.

38. The method of claim 37, wherein said scheduling is further based, at least in part, on at least one of the following: availability of said one or more stationary transponder devices; operational capacity of said one or more stationary transponder devices; location of said one or more stationary transponder devices; or any combination thereof.

39. An apparatus for location determination comprising:
- a communication interface to communicate with an electronic communications network; and
- one or more processors coupled to a memory to:
  - collect estimates of a bias between a first clock maintained at a first mobile device and a second clock maintained at one or more stationary transponder devices, said bias to be determined based, at least in part, on a difference between a location of said first mobile device and locations of said one or more stationary transponder devices, and a timing reference detected in one or more signals acquired from said one or more stationary transponder devices; and
  - make available said estimates of said bias as part of positioning assistance data for computing a range said first mobile device or one or more other mobile devices to said one or more stationary transponder devices to be based, at least in part, on a time of flight-related measurement acquired from said one or more signals and on said estimates of said bias.

40. The apparatus of claim 39, wherein said one or more processors further to schedule a message exchange and said time of flight-related measurement to be based, at least in part, on said collected estimates of said bias.

* * * * *